(12) United States Patent
Straayer et al.

(10) Patent No.: US 9,413,228 B2
(45) Date of Patent: Aug. 9, 2016

(54) 2-PHASE THRESHOLD DETECTOR BASED CIRCUITS

(75) Inventors: Matthew Z. Straayer, Acton, MA (US); Hae-Seung Lee, Lexington, MA (US); Kush Gulati, Weston, MA (US); Carlos E. Munoz, Chelmsford, MA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1123 days.

(21) Appl. No.: 12/983,472

(22) Filed: Jan. 3, 2011

(65) Prior Publication Data

US 2011/0169340 A1      Jul. 14, 2011

Related U.S. Application Data

(60) Provisional application No. 61/294,604, filed on Jan. 13, 2010.

(51) Int. Cl.
*H03K 5/153*        (2006.01)
*H02M 3/07*         (2006.01)

(52) U.S. Cl.
CPC ...................................... *H02M 3/07* (2013.01)

(58) Field of Classification Search
CPC ....................................................... H02M 3/07

USPC ................................................ 327/78, 79, 337
See application file for complete search history.

(56) References Cited

U.S. PATENT DOCUMENTS

| | | | |
|---|---|---|---|
| 7,319,425 B2 | 1/2008 | Fiorenza et al. | |
| 7,459,942 B2 | 12/2008 | Lee | |
| 7,486,115 B2 | 2/2009 | Lee | |
| 7,737,732 B2 * | 6/2010 | Lee | 327/91 |

* cited by examiner

*Primary Examiner* — Kenneth B Wells
(74) *Attorney, Agent, or Firm* — North Weber & Baugh LLP

(57) ABSTRACT

A switched capacitor circuit includes a threshold detector to generate a threshold detection signal when a difference between first and second input signals crosses a predetermined level. A variable current source produces a varying amount of current in response to the difference between the input signals. A voltage measurement means produce a measurement signal in response to the difference between the input signals. A correction means produces a correction signal in response to the measurement signal to produce an optimum coarse phase overshoot. A timing comparison means produces a timing signal in response to the difference between the input signals. A correction means produces a correction signal in response to the timing signal to produce an optimum coarse phase overshoot.

4 Claims, 18 Drawing Sheets

2-PHASE THRESHOLD DETECTOR BASED CIRCUITS

PRIORITY INFORMATION

This application claims priority under 35 U.S.C. §119 to U.S. Provisional Patent Application Ser. No. 61/294,604 filed on Jan. 13, 2010, which is incorporated herein by reference in its entirety.

FIELD OF THE PRESENT INVENTION

The present invention relates generally to switched capacitor circuits, analog-to-digital converters, and delta-sigma modulators. More particularly, the present invention relates to 2-phase threshold detector based switched-capacitor circuits to achieve higher accuracy.

BACKGROUND OF THE PRESENT INVENTION

Switched-capacitor circuits based on threshold detectors such as a comparator and a zero-crossing detector can operate at high speeds at more than an order of magnitude lower power consumption than traditional circuits. The primary source of inaccuracy in threshold detector based circuits is the output voltage overshoot that results from the finite delay of the threshold detector. The amount of the output overshoot is the ramp rate multiplied by the delay of the threshold detector. In high speed circuits, the ramp rate must be very high. For example, in 200 MS/s pipeline analog-to-digital converters, each half clock phase is only about 2 ns if non-overlapping clock requirements are included. Subtracting the preset time necessary for the operation of the threshold detector based circuits, approximately 1.5 ns remains. In single phase threshold detector based circuits, the ramp must traverse the full scale of about 1V in 1.5 ns, giving a ramp rate of 0.66V/ns. At this high ramp rate, a typical 200 ps delay of the threshold detector results in 133 mV output overshoot.

With enough over-range and digital error-correction capability, even such a large overshoot only translates to constant input referred offset. In practice, however, the variation of the overshoot is the problem. The ramp rate and the delay may change with process and temperature, causing a process and temperature dependent overshoot. More troublesome is the overshoot variation with the output signal. The ramp is not perfectly linear due to the finite output resistance of the current source and nonlinear parasitic capacitance. Therefore, the ramp rate is typically a function of the output voltage. The overshoot, as a consequence, is also a function of the output voltage. This signal dependent overshoot gives similar effects to finite gain in op-amp based circuits, and hence causes nonlinearity in the resulting circuit characteristic. In analog-to-digital converters, for example, differential nonlinearity (DNL) and integral nonlinearity (INL) result.

In order to reduce the overshoot and resulting nonlinearity, the basic principle of a two phase technique was demonstrated in the prior art. The prior art 2-phase circuit is illustrated in FIG. 1. Two current sources, 11 and 12, produce the coarse and the fine ramps, respectively. During the coarse phase, the current source 11 charges the capacitor network. The value of the current source 11 is chosen such that a fast up-ramp is obtained. Typically, the time allowed for the coarse phase is less than 50% of the half clock phase. When the threshold detector trips, the up-ramp current 11 is turned off. The coarse phase overshoot $V_{OSI}$, as shown in FIG. 2, is the product of the coarse phase ramp rate and the delay $t_{d1}$ of the threshold detector 20. Due to the high rate of the ramp, the coarse phase overshoot, $V_{OSI}$ shown in FIG. 2, can be large. The fine phase reduces the overshoot substantially. Immediately after the fine phase, the down-ramp current 12 is turned on. When threshold crossing is detected during the fine phase, the sampling switch 30 is turned off, locking the sampled charge.

The fine phase ramp can be made much slower than the first phase ramp because it only traverses the amount of the coarse phase overshoot rather than the full scale. The fine phase ramp rate can be further reduced by correcting for the coarse phase overshoot as shown in FIG. 3. Since the coarse phase overshoot $V_{OSI}$ is largely constant, it can be corrected by shifting threshold of the threshold detector 20 down by the input referred overshoot $V_{OC}$. In the prior art, this is accomplished by switching the reference input of the threshold detector to 20 $V_{OC}$ during the coarse phase by turning ON the switch 31 in FIG. 1 and turning OFF the switch 32 in FIG. 1, and returning the voltage to the common-mode voltage $V_{CM}$ during the fine phase by turning ON the switch 32 and turning OFF the switch 31. If $V_{OC}-V_{CM}=V_{OS1}$, the coarse phase overshoot will be zero. In practice, a small amount of overshoot must be allowed during the coarse phase to ensure the ramp crosses the threshold voltage of the threshold detector 20 in the presence of the variation in the overshoot. This is accomplished by making $V_{OC}-V_{CM}$ slightly smaller than $V_{OS1}$. Since the remaining coarse phase overshoot is much smaller, the fine phase ramp can be made substantially slower, for example by an order of magnitude, than that of the coarse phase. As a consequence, for a given delay of the threshold detector, the final output overshoot $V_{OS2}$ is greatly reduced. This not only improves the input referred offset, but also improves the linearity between the input and output voltages of the circuit. In addition, the threshold detector input is better balanced during the threshold crossing detection, thus the power supply rejection is greatly improved. Although the input of the threshold detector is unbalanced during the coarse phase threshold detection, it poses no problem because any noise or error introduced during the coarse phase is removed during the fine phase.

SUMMARY OF THE PRESENT INVENTION

One aspect of the present invention is a switched-capacitor circuit based on two phase threshold detection.

Another aspect the present invention is the compensation of the coarse phase overshoot in fully differential threshold detector based circuits.

Another aspect the present invention is removing the temperature and process dependence of the coarse phase overshoot compensation.

Another aspect of the present invention is variable charging current for the coarse phase to reduce the coarse phase overshoot. One method of providing the variable charging current is a transconductor.

Another aspect of the present invention is the measurement of the coarse phase overshoot. One method measures the overshoot directly by monitoring the voltage at the input of the threshold detector. Another method measures the overshoot in the time domain by monitoring the threshold crossing instant in the fine phase.

Another aspect of the present invention is the compensation of the coarse phase overshoot. In one embodiment of the invention, the overshoot is cancelled by adding or subtracting charge from the capacitor network. In another embodiment, the overshoot is compensated by introducing effective offset in the threshold detector.

Another aspect of the present invention is to facilitate sharing of a single differential amplifier as the input of the variable current source and the threshold detector.

Another aspect of the present invention is the feedback control of the overshoot for optimal amount of the overshoot. One of the methods for the measurement of the overshoot can be combined with one method of the overshoot compensation in a feedback loop to achieve an optimal overshoot or undershoot.

BRIEF DESCRIPTION OF THE DRAWINGS

The present invention may take form in various components and arrangements of components. The drawings are only for purposes of illustrating a preferred embodiment and are not to be construed as limiting the present invention, wherein.

DETAILED DESCRIPTION OF THE PRESENT INVENTION

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

Figure 1:
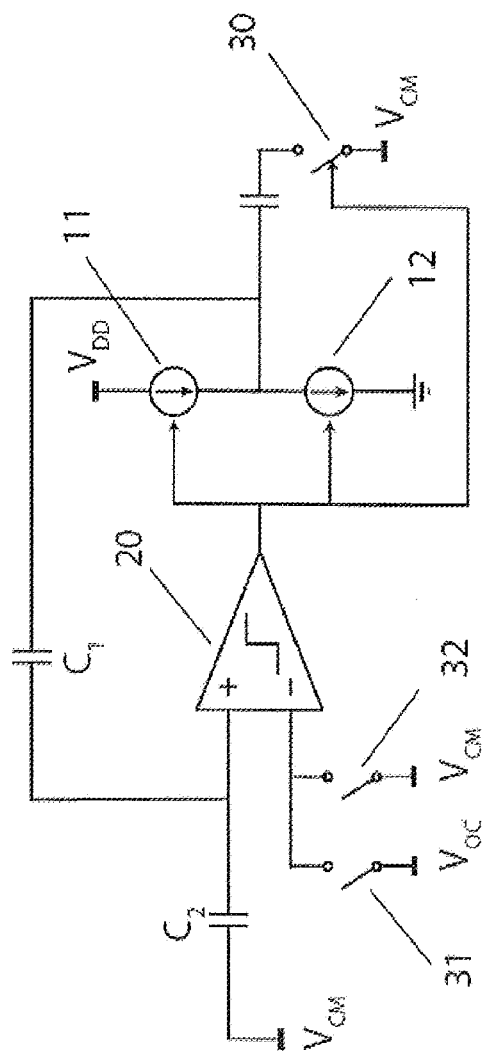
FIG. 1 illustrates a prior art 2-phase threshold detector based circuit.
Figure 2:
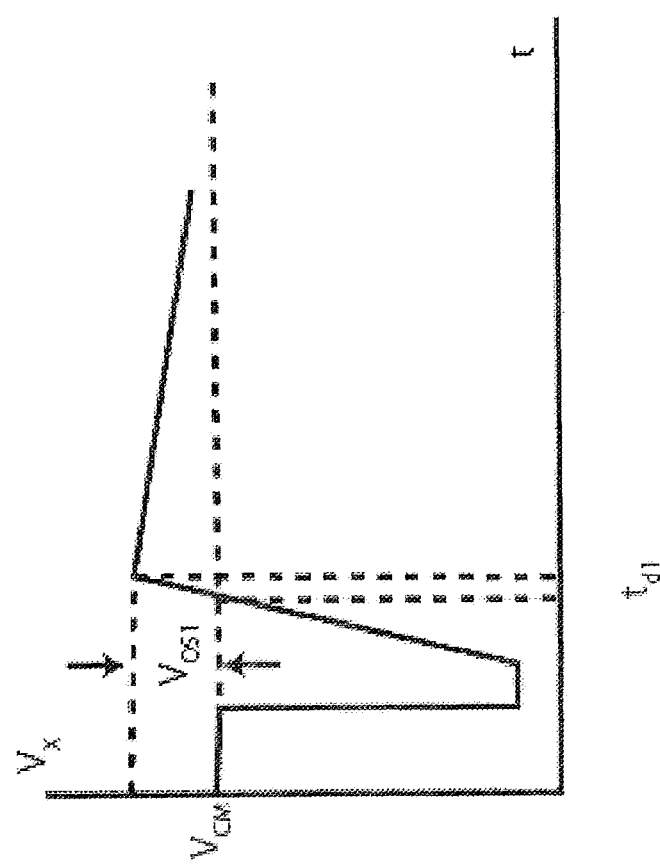
FIG. 2 illustrates output waveform of prior art 2-phase threshold detector based circuit.
Figure 3:
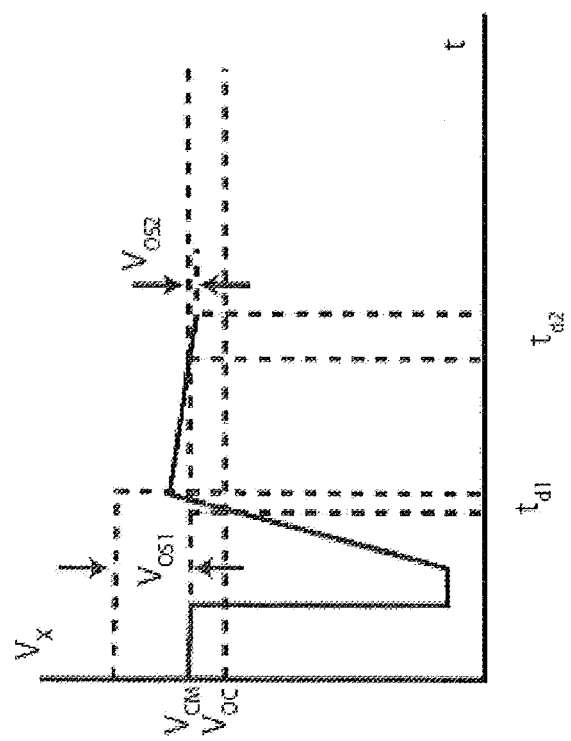
FIG. 3 illustrates output waveform of prior art 2-phase threshold detector based circuit with overshoot correction.

The prior art 2-phase circuit was implemented in a single-ended comparator-based signal path. However, for robustness and better power supply rejection, a fully-differential signal path is strongly desired. The removal of the coarse phase overshoot by shifting the threshold as shown in FIG. 1 cannot be extended directly to fully-differential circuits. In addition, the constant shift of threshold does not track the process and temperature variation of the overshoot.

Figure 4:
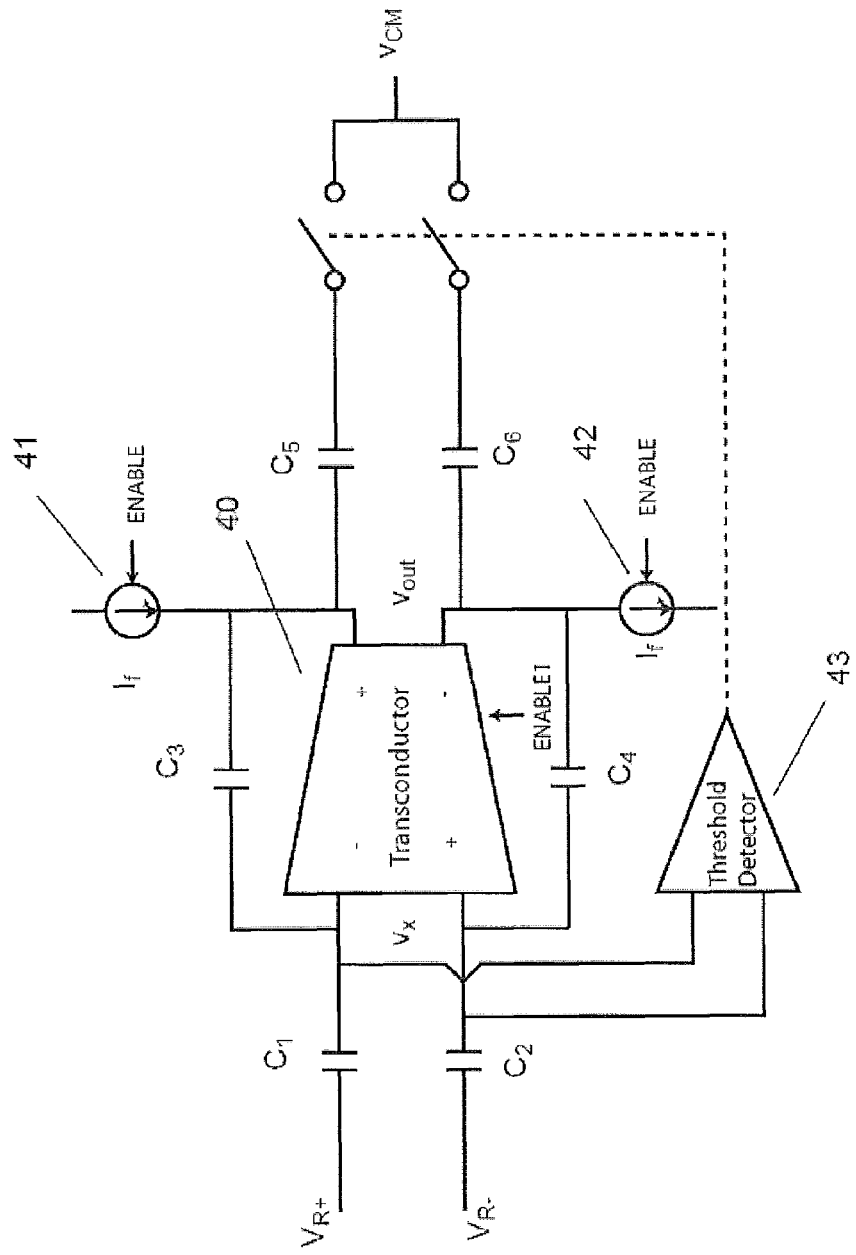
FIG. 4 illustrates an exemplary embodiment of the present invention.
Figure 5:
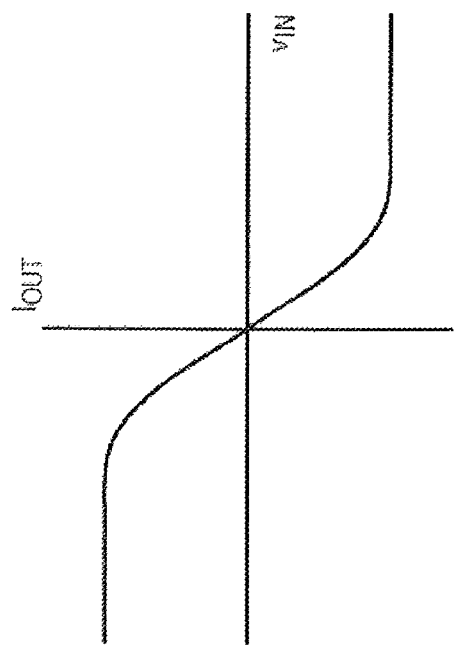
FIG. 5 the I-V characteristic of a conventional transconductor
Figure 6:
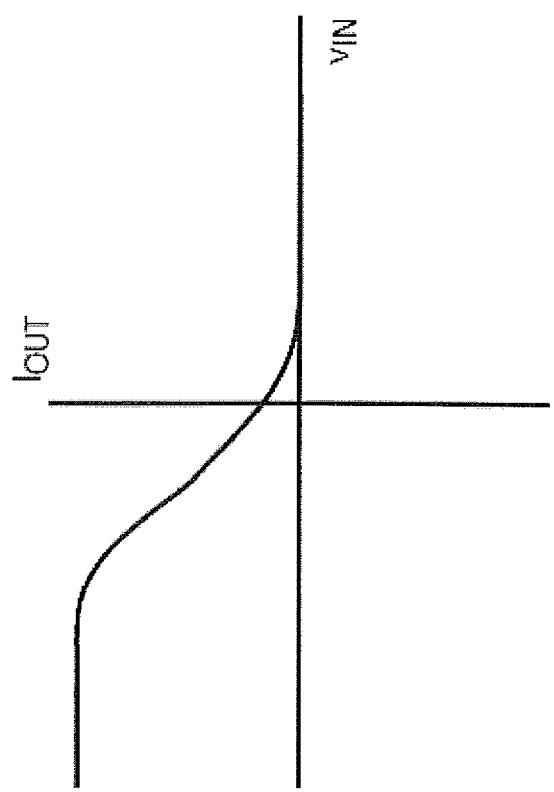
FIG. 6 illustrates the preferred I-V characteristic of a transconductor according to the concepts of the present invention.
Figure 7:
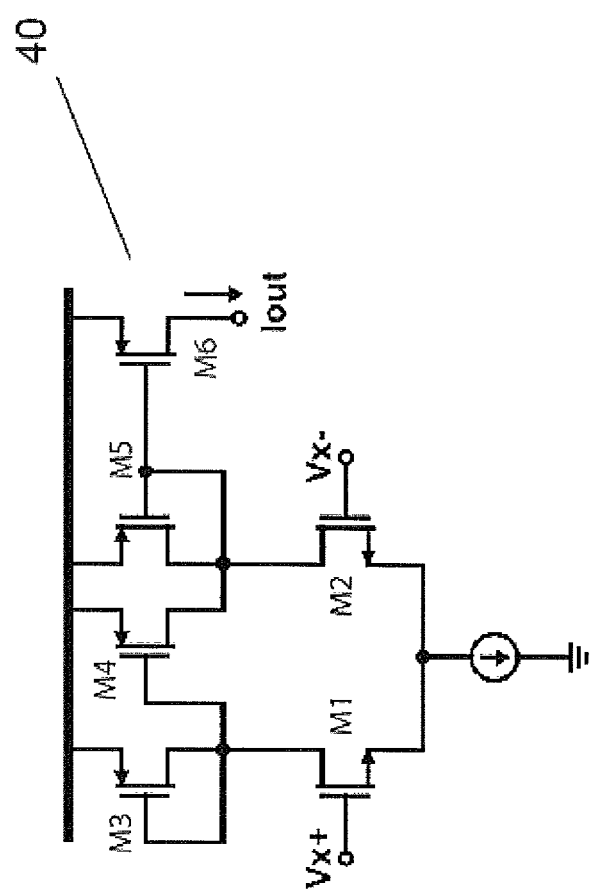
FIG. 7 illustrates the schematic diagram of a transconductor according to the concepts of the present invention.
Figure 8:
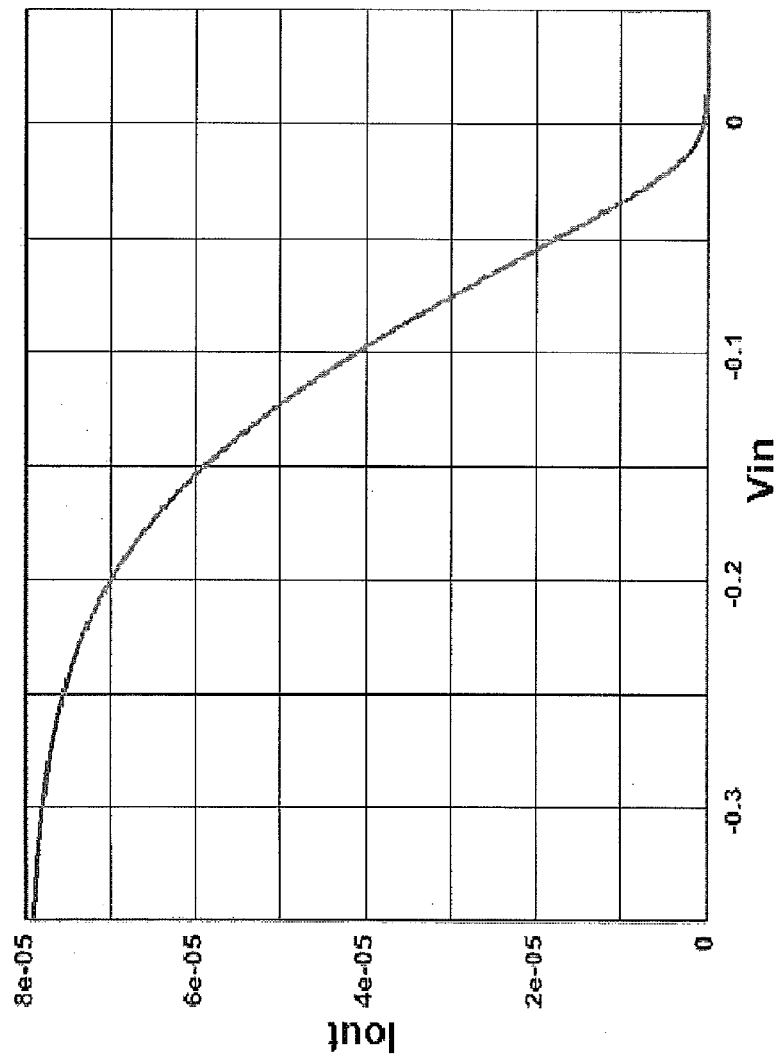
FIG. 8 illustrates the computer simulated I-V characteristic of the transconductor in FIG. 7.

The present invention reduces the coarse phase overshoot and is applicable to both single-ended and fully-differential signal paths. In the first embodiment of the present invention, the charging current during the coarse phase is made variable as a function of the input voltage to the threshold detector. The charging current is reduced as the input voltage to the threshold detector approaches zero. This reduces the coarse phase ramp rate near the threshold crossing detection point, reducing the overshoot considerably. The first embodiment of the present invention employs a transconductor 40 shown in FIG. 4 as a variable current source. The circuit configuration is shown during the charge-transfer phase of the switched-capacitor circuit. transconductor 40 provides an output current as a function of the input voltage $v_X$ of the transconductor 40 during the coarse phase. Unlike a traditional transconductor which has a symmetric I-V characteristic shown in FIG. 5, the transconductor 40 in the 2-phase circuit has preferably a unidirectional I-V characteristic, i.e., the output current does not become negative. Therefore, the transconductor characteristic shown in FIG. 6 is preferred. The finite amount of positive output current near $v_{IN}=0$ ensures small but finite overshoot in the coarse phase as desired in the two phase threshold detector based operation. During the fine phase, the fine current sources 41 and 42 are enabled and provide the fine phase ramp. The schematic diagram of one embodiment of the transconductor 40 is shown in FIG. 7. The simulated I-V characteristic of the transconductor is shown in FIG. 8.

The power consumption of the 2-phase threshold detector based circuit is dominated by the threshold detector speed and noise requirements in the fine phase. The power consumption in the transconductor 40 is generally negligible compared with that in the threshold detector. Therefore, the transconductor 40 adds very little penalty in power consumption compared with prior art threshold detector based circuits where constant charging currents are used. In computer simulations, the first embodiment of the present invention has been shown to reduce the overshoot and the input referred offset by a large factor without compromising the speed of operation. Therefore, much higher accuracy is achievable with the variable current charging method of the present invention.

The accuracy of the 2-phase circuit is determined by the variation in the fine phase overshoot. The smaller the fine phase overshoot, the better the accuracy becomes. The constant overshoot at the end of the fine phase manifests itself as a constant input referred offset. The signal-dependent variation of the fine phase overshoot, however, gives rise to non-linearity, and ultimately limits the speed-accuracy trade off of the 2-phase circuit. The primary cause of the variation of the overshoot is the signal dependent ramp rate variation due to the finite output resistance of the fine phase current source and the capacitance variation due to the nonlinear parasitic capacitance. It is highly desirable to reduce the fine phase overshoot because the overshoot variation is proportional to the magnitude of the fine phase overshoot. The overshoot is the product of the ramp rate and the delay of the threshold detector. Given the threshold detector delay, the overshoot can be minimized by minimizing the fine phase ramp rate.

Figure 9:
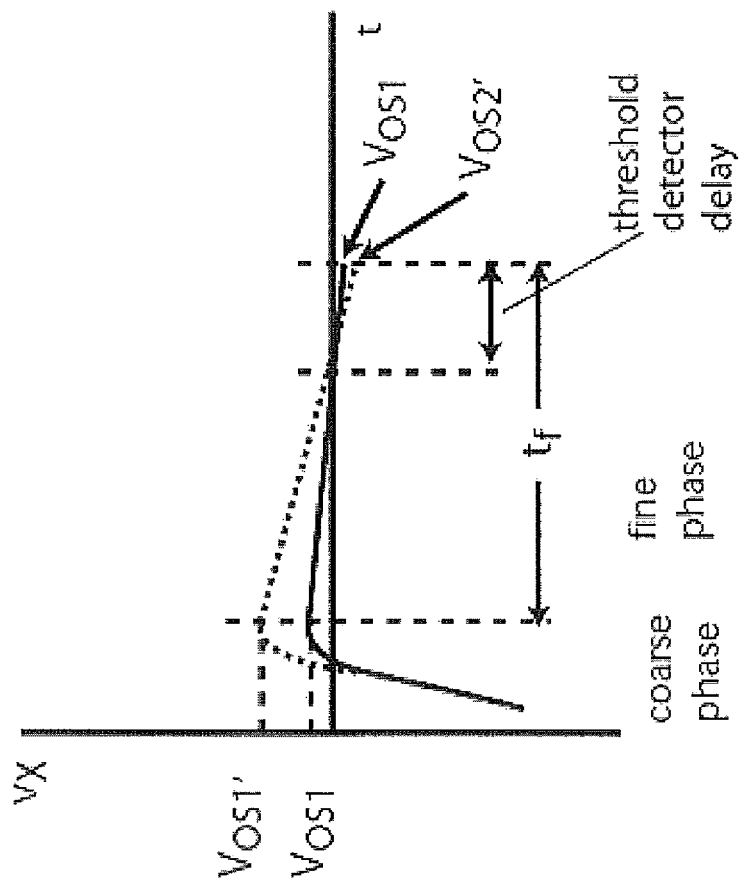
FIG. 9 illustrates the differential voltage at the input of the threshold detector $v_X = v_{X+} - v_{X-}$.

In FIG. 9, the differential voltage at the input of the threshold detector $v_X = v_{X+} - v_{X-}$ is plotted as a function of time The fine phase ramp rate is determined by the coarse phase overshoot $V_{OS1}$ and the fine phase duration $t_f$ as indicated in FIG. 9. The smaller $V_{OS1}$, the lower the ramp rate can be, and the smaller the fine phase overshoot $V_{OVF}$ given constant delay of the threshold detector during the fine phase. In FIG. 9, the larger coarse phase overshoot $V_{OS1'}$ results in larger fine phase overshoot $V_{OS2'}$ (dotted line). Therefore, it is important to minimize the coarse phase overshoot for best accuracy.

One way to measure the coarse phase overshoot is a direct measurement by monitoring at the input $v_X$ of the threshold detector. If the threshold detector had zero delay, the differential input of the zero-crossing detector would be zero at the instant the zero-crossing detector trips. In reality, the finite delay causes the threshold detector to trip past the point where the differential input voltage $v_X$ of the threshold detector is zero. Therefore, the differential input voltage $v_X$ of the threshold detector at the instant it trips is the measure of the delay and consequential overshoot. This voltage can be directly measured by, for example, an A/D converter. The A/D converter can measure the voltage $v_X$ once every number of samples, and thus a slow A/D converter such as a delta-sigma A/D converter can be used. The overshoot can be then compensated in a feedback calibration loop. In the second embodiment of the present invention shown in FIG. 10, overshoot compensation capacitors 51, 52, and a digital-to-analog converter 70 are used to adjust the overshoot. The current sources 41 and 45 are enabled during the coarse phase to produce a coarse ramp and the current sources 42 and 46 are enabled during the fine phase to produce a fine ramp. An A/D converter 60 samples and measures $v_X$ directly at the instant the threshold detector 43 trips. The digital controller 61 controls the output of the DIA converter 70 such that $v_X$ is at a desired level at the instant the detector 43 trips at the end of the coarse phase. The overshoot compensation capacitors 51 and 52 are discharged during the sampling phase of the operation. During the coarse phase, switches 53 and 54 are thrown to the output of the D/A converter 70. During the subsequent fine phase, switches 53 and 54 are thrown to the system common-mode voltage $V_{CM}$. This lowers the voltage $v_X$ at the beginning of the fine phase. The extent that the voltage $v_X$ is lowered is determined by the output of the D/A converter 70 and ratios of capacitors.

In principle, precise compensation can be introduced at the input of the zero-crossing detector to cancel the coarse phase overshoot exactly. In practice, however, since the coarse phase overshoot varies by a small amount, a small amount of overshoot is required during the coarse phase such that a positive overshoot is always present, as illustrated in a solid trace in FIG. 11. Alternatively, a small amount of undershoot is allowed instead, followed by a fine phase ramp in the same direction as the coarse phase as shown in a solid trace in FIG. 12. Such an implementation is a straightforward extension of the second embodiment.

Figure 11:
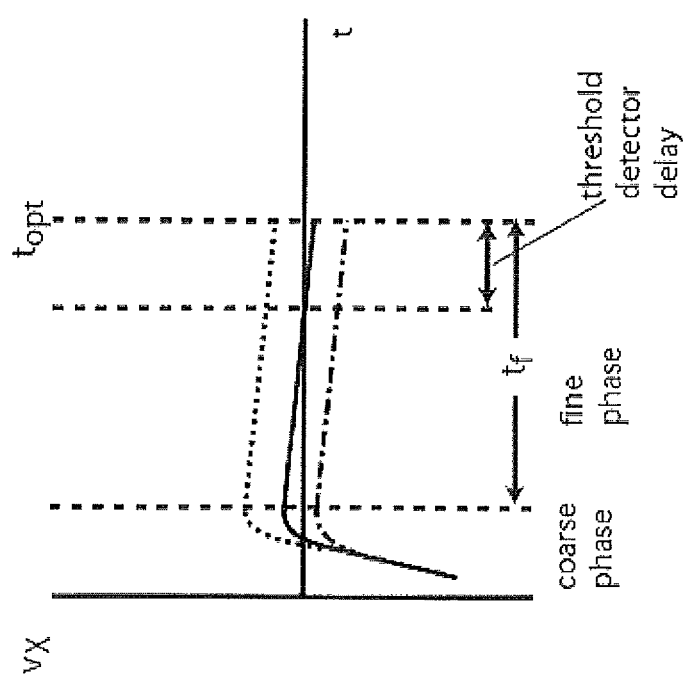
FIG. 11 illustrates the differential voltage at the input of the threshold detector $v_X = v_{X+} - v_{X-}$ with a varying amount of the coarse phase overshoot.
Figure 12:
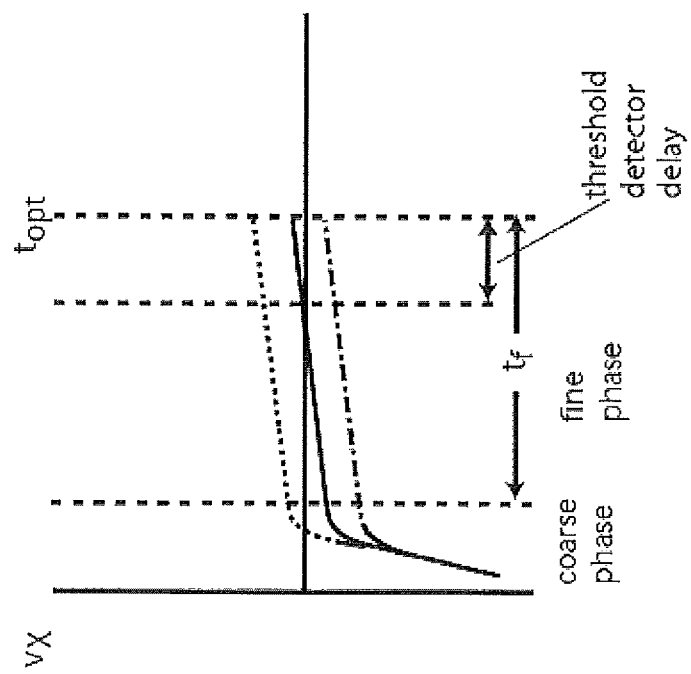
FIG. 12 illustrates the differential voltage at the input of the threshold detector $v_X = V_{X+} - v_{X-}$ with a varying amount of the coarse phase undershoot.
Figure 13:
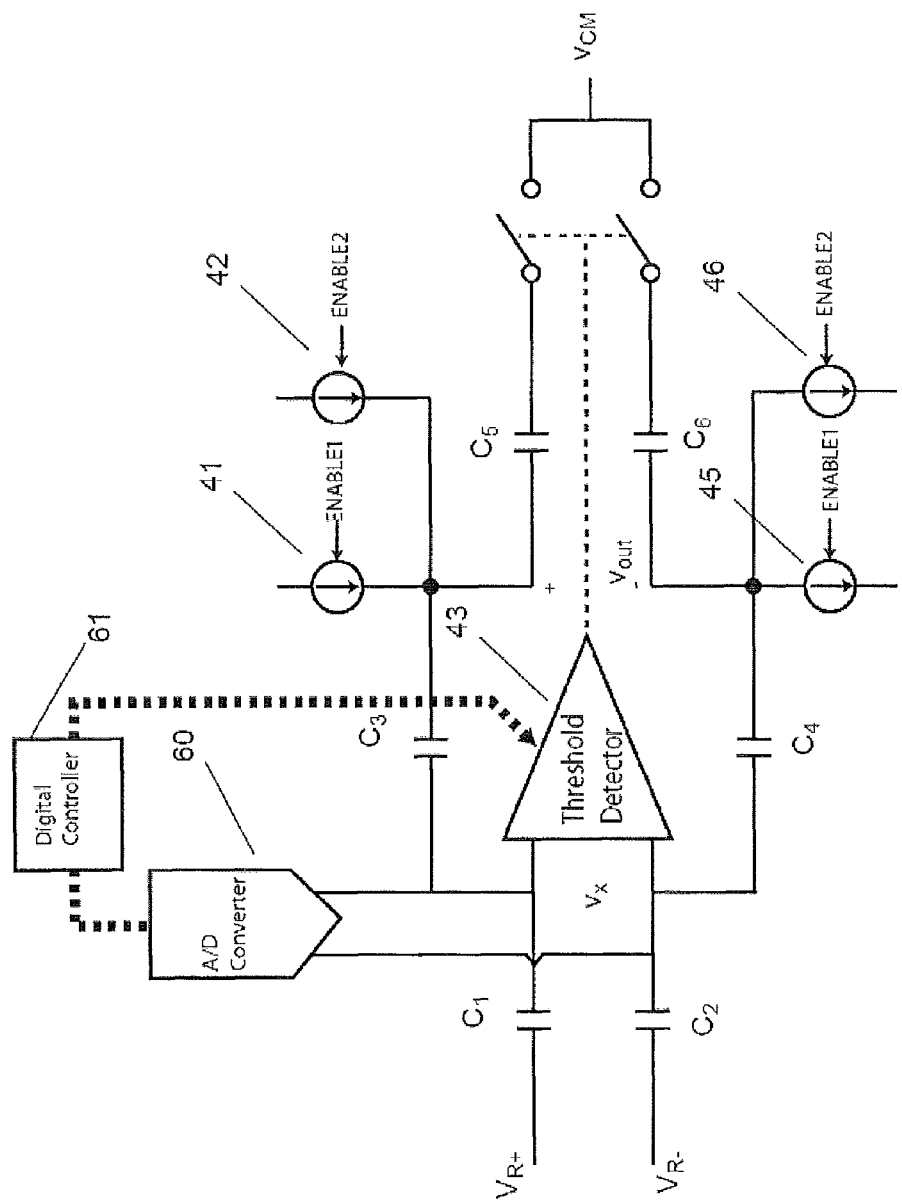
FIG. 13 illustrates a third exemplary embodiment of the present invention.

In the third embodiment of the present invention shown in FIG. 13, the threshold detector 43 is implemented with a digitally adjustable threshold. An A/D converter 60 measures $v_X$ directly at the instant the threshold detector 43 trips. Based on the output of the A/D converter 60, the digital controller 61 controls the threshold of the detector 43 such that $v_X$ is at the desired level at the instant the detector 43 trips end of the coarse phase. Since the coarse phase overshoot varies by a small amount, the desired level of the coarse-phase overshoot is a small positive amount such that a small overshoot is always present, as illustrated in FIG. 11. Alternatively, a small amount of undershoot is allowed instead, followed by a fine phase ramp in the same direction as the coarse phase as shown in FIG. 12. Such an implementation is a straightforward extension of the third embodiment.

Figure 14:
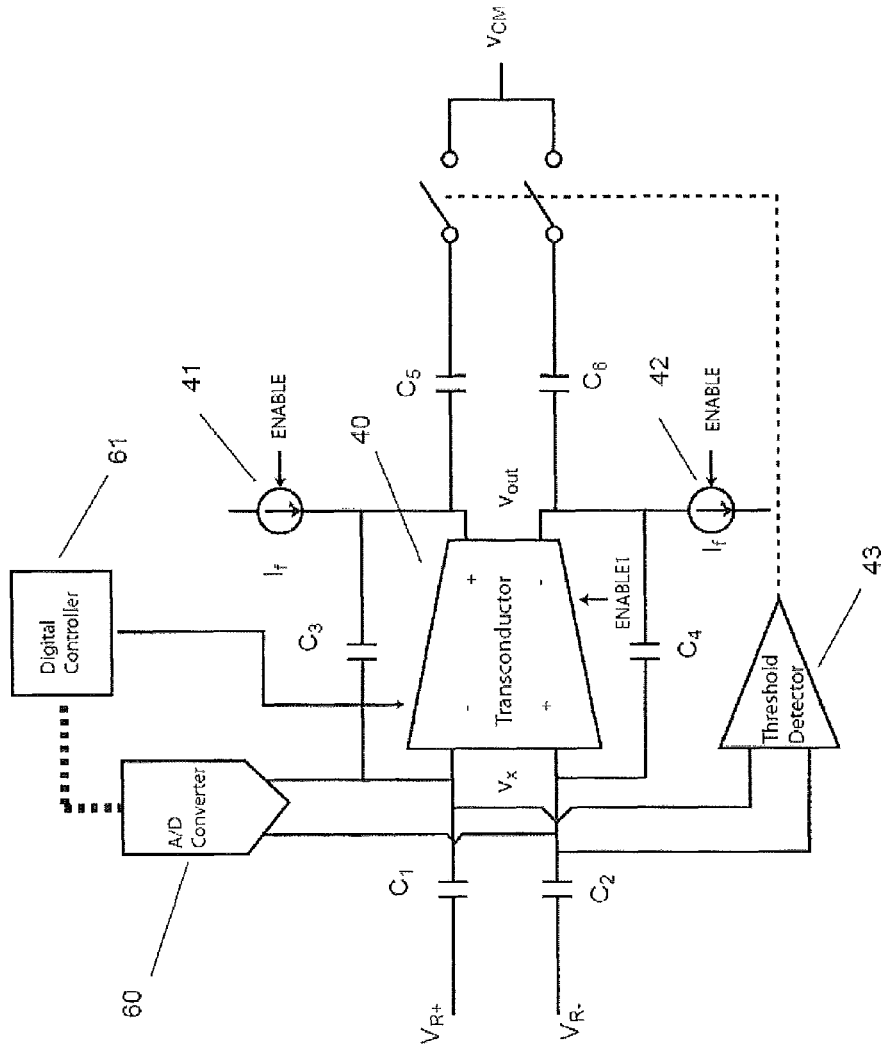
FIG. 14 illustrates a fourth exemplary embodiment of the present invention.

In the fourth embodiment of the present invention shown in FIG. 14, the transconductor 40 is implemented with an adjustable threshold. For example, the width of the transistor M5 in the transconductor shown in FIG. 5 is made digitally programmable, which introduces imbalance in the load and provides programmable offset. An A/D converter 60 measures $v_X$ directly at the instant the threshold detector 43 trips. The digital controller 61 digitally controls the offset of the transconductor 40 such that $v_X$ is at the desired level at the instant the detector 43 trips end of the coarse phase. Since the coarse phase overshoot varies by a small amount, the desired level of the coarse-phase overshoot is a small positive amount such that a small overshoot is always present, as illustrated in FIG. 11. Alternatively, a small amount of undershoot is allowed instead, followed by a fine phase ramp in the same direction as the coarse phase as shown in FIG. 12. Such an implementation is a straightforward extension of the fourth embodiment.

Instead of the direct measurement of $v_X$, the coarse phase overshoot can be inferred by the timing of the fine phase threshold crossing. FIG. 11 shows the output voltage waveform of a threshold detector based circuit. For best accuracy, the threshold detector must trip near the end of the clock phase at time $t_{opt}$ as indicated by the solid trace in FIG. 11. If the coarse phase overshoot is too large, the threshold crossing detector does not trip (the dotted trace in FIG. 11) during the fine phase, and if the coarse phase overshoot is too small, the threshold detector will trip before the start of the coarse phase (the dashed trace in FIG. 11). In either case, the accuracy of the circuit is greatly compromised. By comparing the actual time the fine phase crossing is detected with the optimum time, the coarse phase overshoot can be inferred and adjusted.

Figure 15:
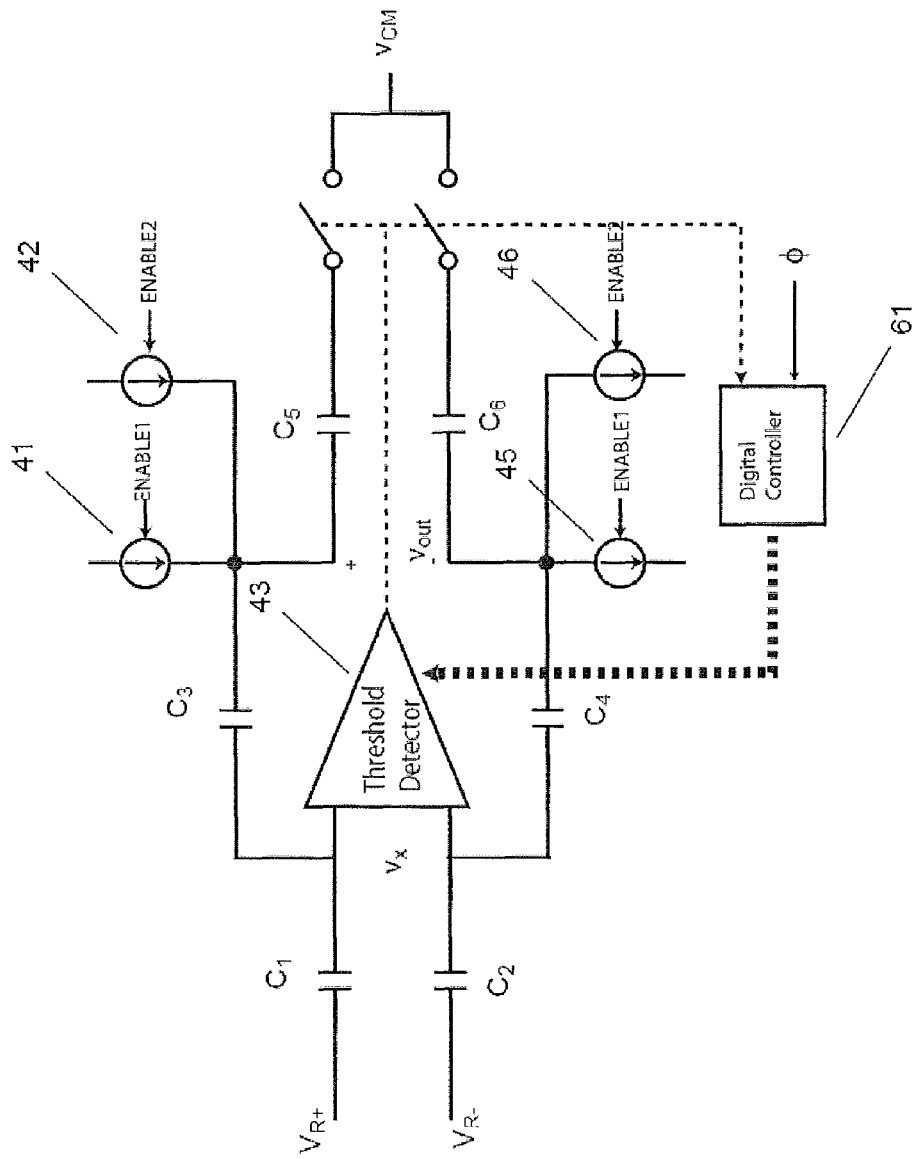
FIG. 15 illustrates a fifth exemplary embodiment of the present invention.

The fifth embodiment of the present invention is illustrated in FIG. 15. The offset of the threshold detector 43 is made digitally adjustable. The current sources 41 and 45 are enabled during the coarse phase to produce a coarse ramp and the current sources 42 and 46 are enabled during the fine phase to produce a fine ramp. The coarse phase overshoot is indirectly measured and adjusted such that the threshold detector 43 trips at the optimum time (the solid trace FIG. 11). The offset of the threshold detector is adjusted to achieve the optimum overshoot. An automatic timing-based calibration of the offset is used to achieve optimum overshoot. The calibration is done by monitoring the fine phase threshold crossing instant. The digital controller compares the output of the threshold detector 43 with the desired phase φ. If the threshold crossing occurs later than the desired phase φ, the coarse phase overshoot is too large. In that case, the offset is decremented in the threshold detector 43. This reduces the coarse phase overshoot. On the other hand, if the fine phase threshold crossing happens earlier than the desired phase φ, the coarse phase overshoot is too small, and the offset of the threshold detector 43 is increased to make the overshoot larger. Since the coarse phase overshoot varies by a small amount, the desired level of the coarse-phase overshoot is a small positive amount such that a small overshoot is always present, as illustrated in FIG. 11. Alternatively, a small amount of undershoot is allowed instead, followed by a fine phase ramp in the same direction as the coarse phase as shown in FIG. 12. Such an implementation is a straightforward extension of the fifth embodiment.

Figure 10:
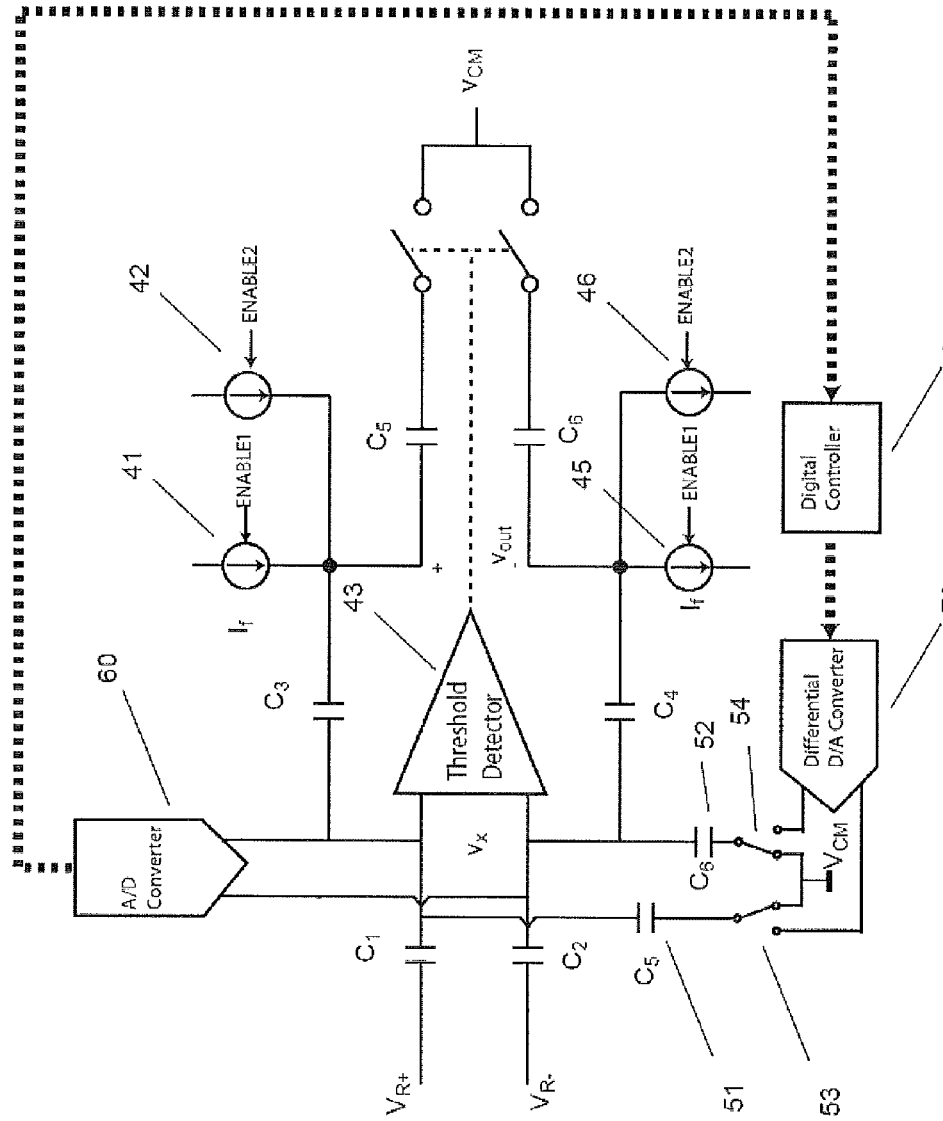
FIG. 10 illustrates a second exemplary embodiment of the present invention.
Figure 16:
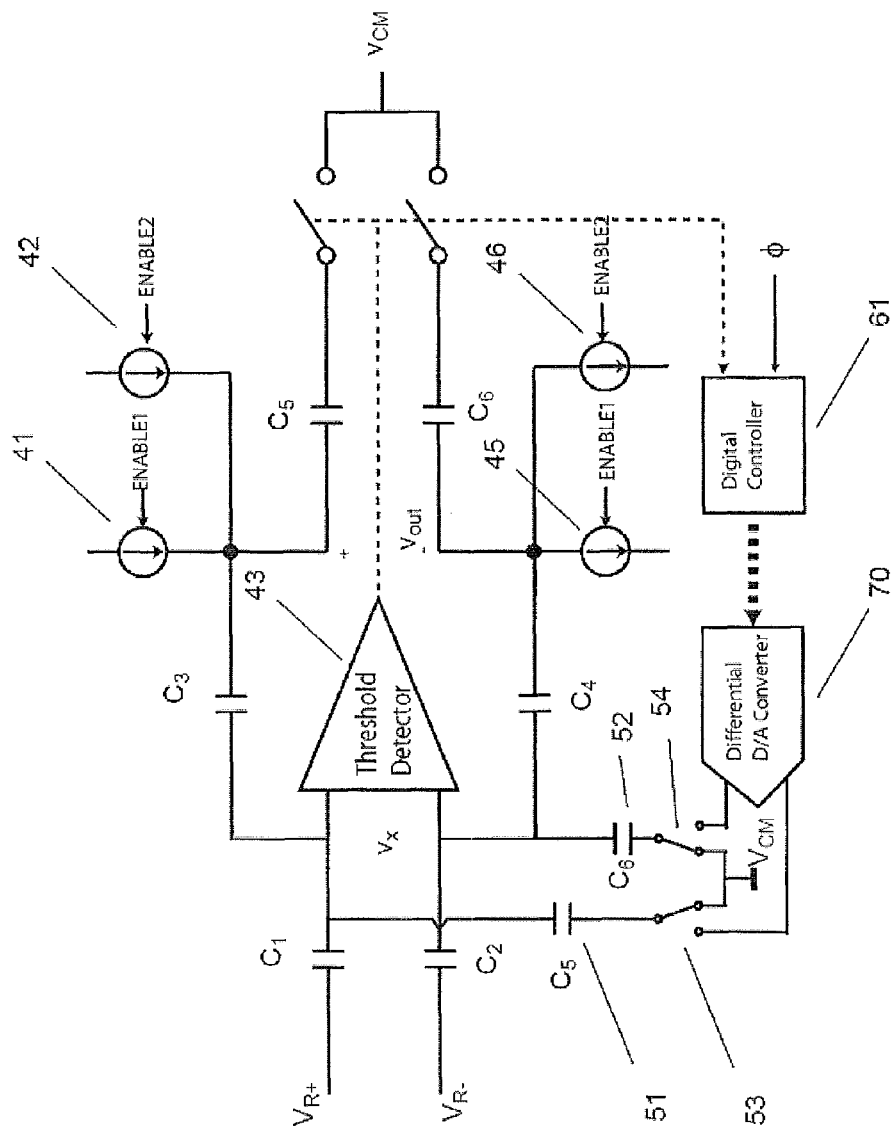
FIG. 16 illustrates a sixth exemplary embodiment of the present invention.

In the sixth embodiment shown in FIG. 16, small capacitors at the inputs of the threshold detector are added in a manner similar to the second embodiment shown in FIG. 10. By changing the voltage on the capacitors between the coarse and the fine phases and by adjusting the output voltage of the D/A converter 70 as in the second embodiment, an effective offset is introduced at the end of the coarse phase. An automatic timing-based calibration of the offset is used to achieve optimum overshoot. The calibration is done by monitoring the fine phase threshold crossing instant. The digital controller compares the output of the threshold detector 43 with the desired phase $\phi$. If the threshold crossing occurs later than the desired phase $\phi$, the coarse phase overshoot is too large. In that case, the offset is decremented by increasing the output voltage of the D/A converter 70. This reduces the coarse phase overshoot. On the other hand, if the fine phase threshold crossing happens earlier than the desired phase $\phi$, the coarse phase overshoot is too small. The output of the D/A converter 70 is decreased to make the overshoot larger. Since the coarse phase overshoot varies by a small amount, the desired level of the coarse-phase overshoot is a small positive amount such that a small overshoot is always present, as illustrated in FIG. 11. Alternatively, a small amount of undershoot is allowed instead, followed by a fine phase ramp in the same direction as the coarse phase as shown in FIG. 12. Such an implementation is a straightforward extension of the sixth embodiment.

Figure 17:
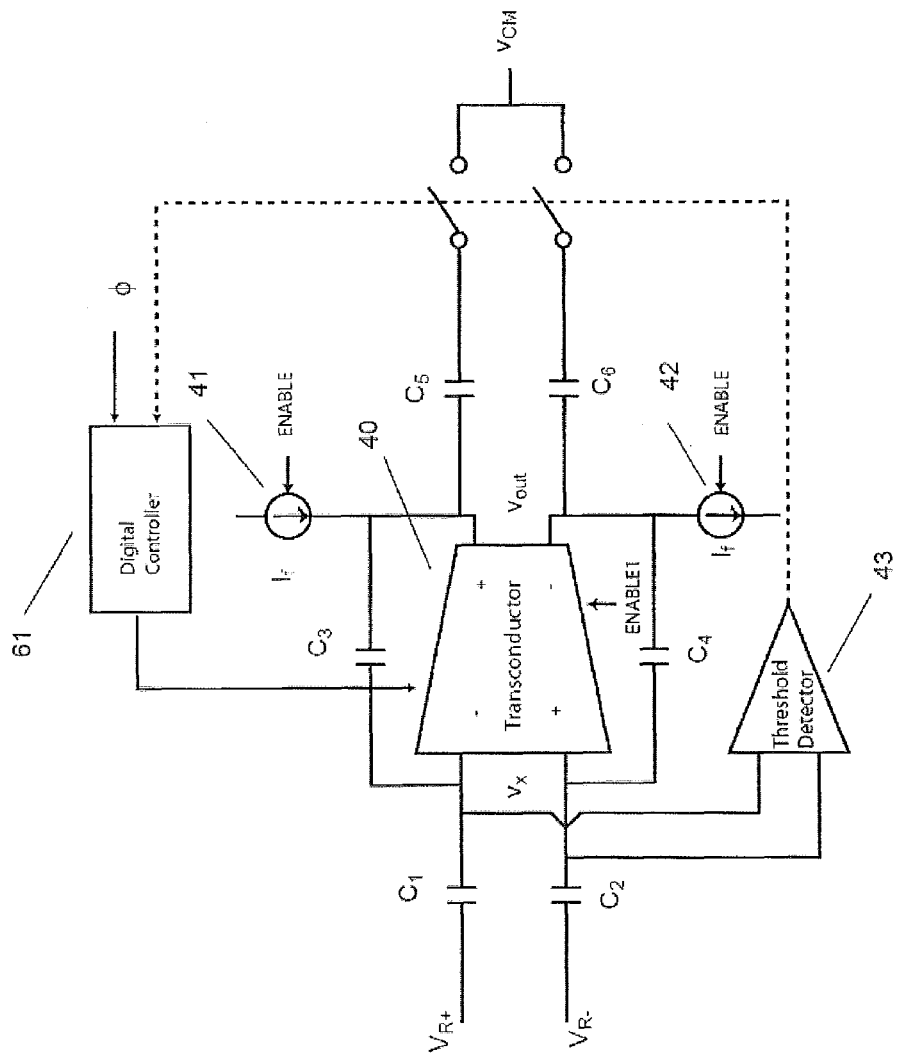
FIG. 17 illustrates a seventh exemplary embodiment of the present invention.

In the seventh embodiment shown in FIG. 17, the offset of the transconductor 40 is made digitally adjustable. For example, the width of the transistor MS in the transconductor shown in FIG. 5 is made digitally programmable, which introduces imbalance in the load and provides programmable offset. An automatic timing-based calibration of the offset is used to achieve optimum overshoot. The calibration is done by monitoring the fine phase threshold crossing instant. The digital controller compares the output of the threshold detector 43 with the desired phase $\phi$. If the threshold crossing occurs later than the desired phase $\phi$, the coarse phase overshoot is too large. In that case, the offset is decremented in the transconductor 40. This reduces the coarse phase overshoot. On the other hand, if the fine phase threshold crossing happens earlier than the desired phase $\phi$, the coarse phase overshoot is too small, the offset of the transconductance 40 is increased to make the overshoot larger. Since the coarse phase overshoot varies by a small amount, the desired level of the coarse-phase overshoot is a small positive amount such that a small overshoot is always present, as illustrated in FIG. 11. Alternatively, a small amount of undershoot is allowed instead, followed by a fine phase ramp in the same direction as the coarse phase as shown in FIG. 12. Such an implementation is a straightforward extension of the seventh embodiment.

Figure 18:
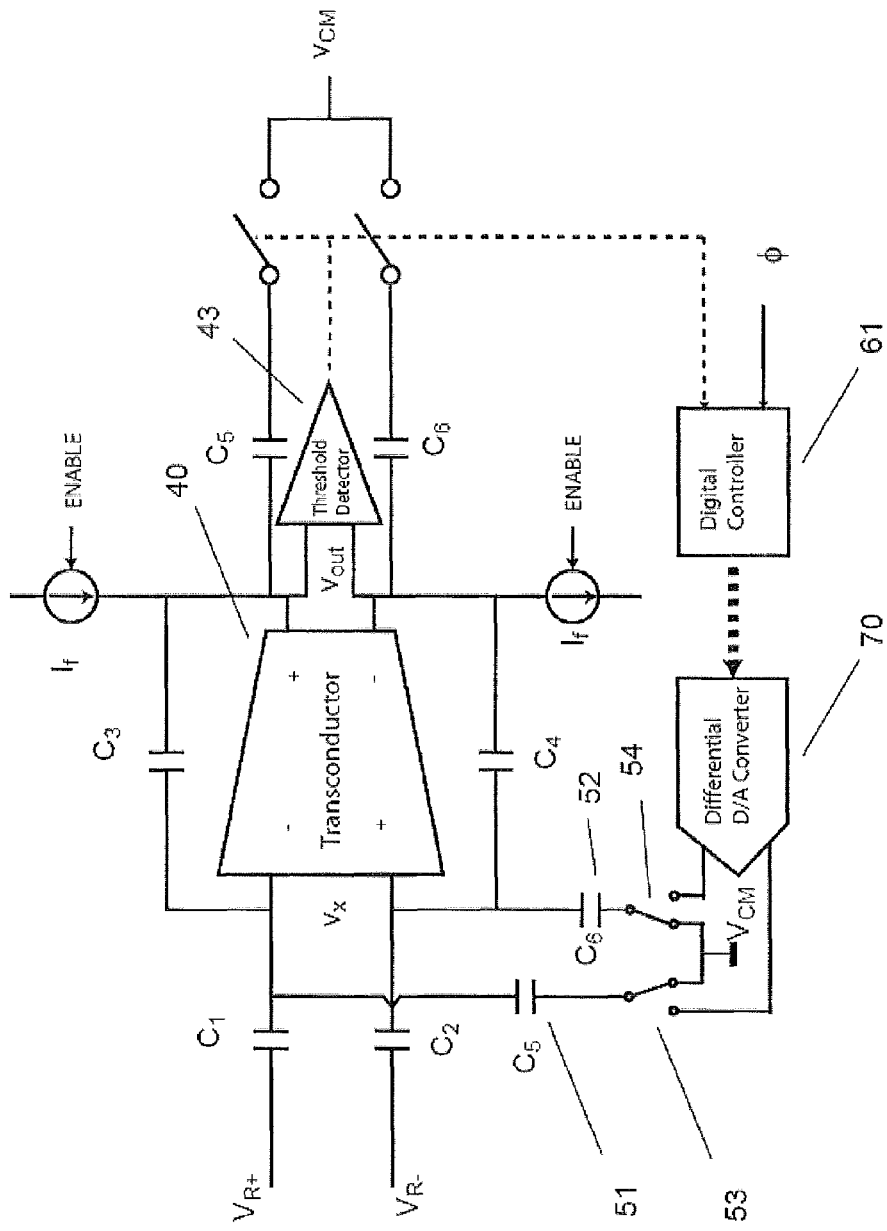
FIG. 18 illustrates an eighth exemplary embodiment of the present invention.

In the eighth embodiment, the transconductor 40 is shown also to function as a preamplifier for the threshold detector 40, as shown in FIG. 18. For example, the width of the transistor M5 in the transconductor shown in FIG. 5 is made digitally programmable, which introduces imbalance in the load and provides programmable offset. An automatic timing-based calibration of the offset is used to achieve optimum overshoot. The calibration is done by monitoring the fine phase threshold crossing instant. The digital controller compares the output of the threshold detector 43 with the desired phase $\phi$. If the threshold crossing occurs later than the desired phase $\phi$, the coarse phase overshoot is too large. In that case, the offset is decremented in the transconductor 40. This reduces the coarse phase overshoot. On the other hand, if the fine phase threshold crossing happens earlier than the desired phase $\phi$, the coarse phase overshoot is too small, and the offset of the transconductance 40 is increased to make the overshoot larger. Since the coarse phase overshoot varies by a small amount, the desired level of the coarse-phase overshoot is a small positive amount such that a small overshoot is always present, as illustrated in FIG. 11. Alternatively, a small amount of undershoot is allowed instead, followed by a fine phase ramp in the same direction as the coarse phase as shown in FIG. 12. Such an implementation is a straightforward extension of the eighth embodiment.

There are several key advantages of the automatic calibration. Since the fine phase offset is minimized, the accuracy improves significantly. In addition, the power supply rejection improves because the threshold detector is better balanced near its trip point, which results in better symmetry of operating condition. It also removes the coarse phase overshoot variation due to the I-V characteristic variation from manufacturing tolerances and temperature variation. It also compensates for other manufacturing tolerances such as the random offsets in the transconductor and the threshold detector as well as the ramp rate variation. The result is improved accuracy, power supply rejection, robustness, and manufacturing yield. The portability to different technologies is also significantly improved.

What is claimed is:

1. A switched-capacitor circuit, comprising:
    a threshold detector comprising a first input and a second input, the threshold detector generates a threshold detection signal when a difference between first and second input signals crosses a predetermined level;
    a plurality of capacitors;
    a variable current source coupled to the first and second inputs, the variable current source is enabled during a coarse phase producing a varying amount of current in response to the difference between the first and the second input signals; and
    a current source enabled during a fine phase.

2. The switched-capacitor circuit as claimed in claim 1, wherein the variable current source is a transconductor.

3. The switched-capacitor circuit as claimed in claim 2, wherein the transconductor has an asymmetric current-voltage characteristic.

4. The switched-capacitor circuit as claimed in claim 2, wherein the transconductor comprises an adjustable offset.

* * * * *